Figure 1:
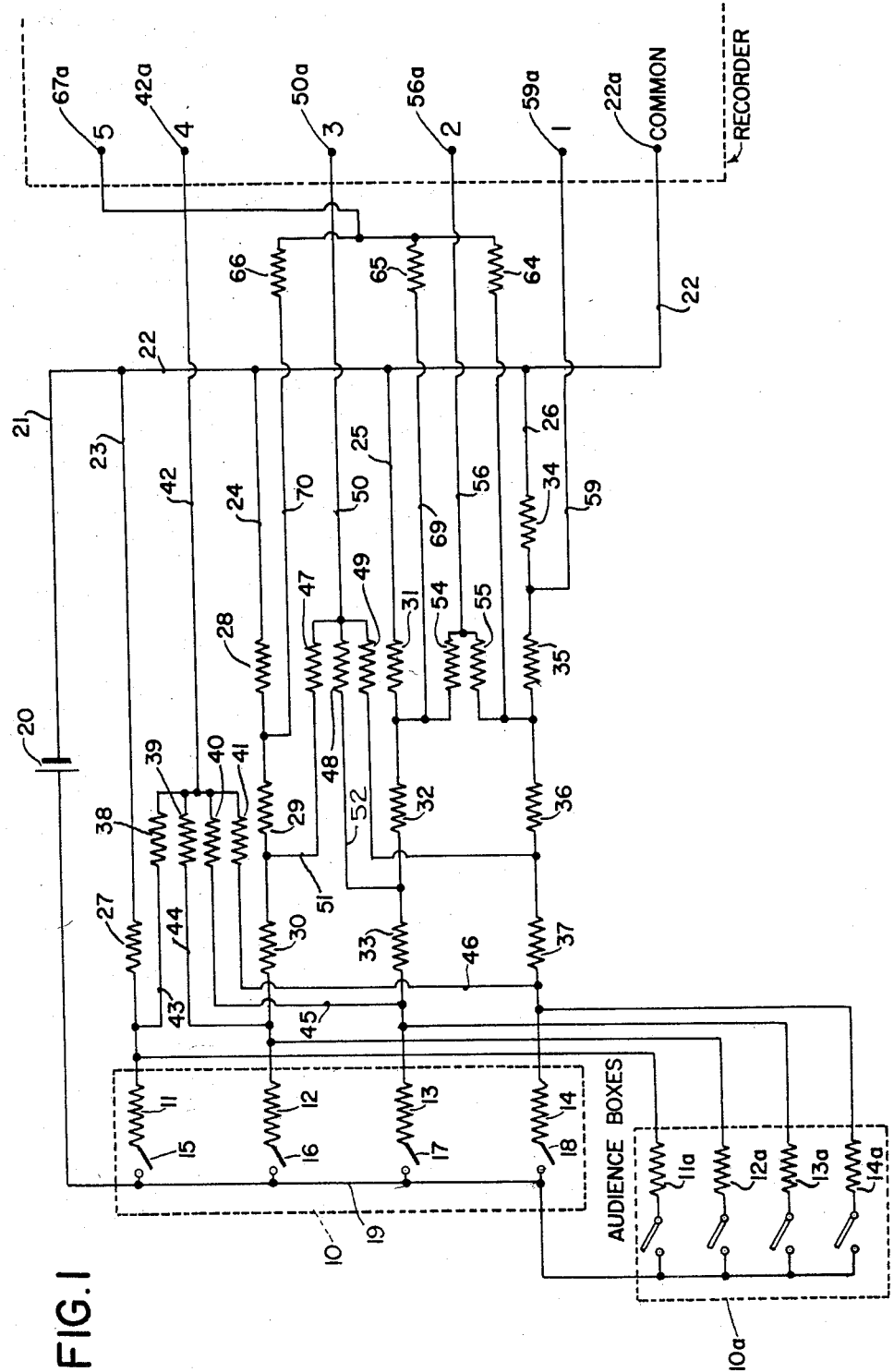

March 24, 1959     W. J. MILLARD, JR     2,878,996

AUDIENCE REACTION MEASURING SYSTEM

Filed Dec. 30, 1954     2 Sheets—Sheet 1

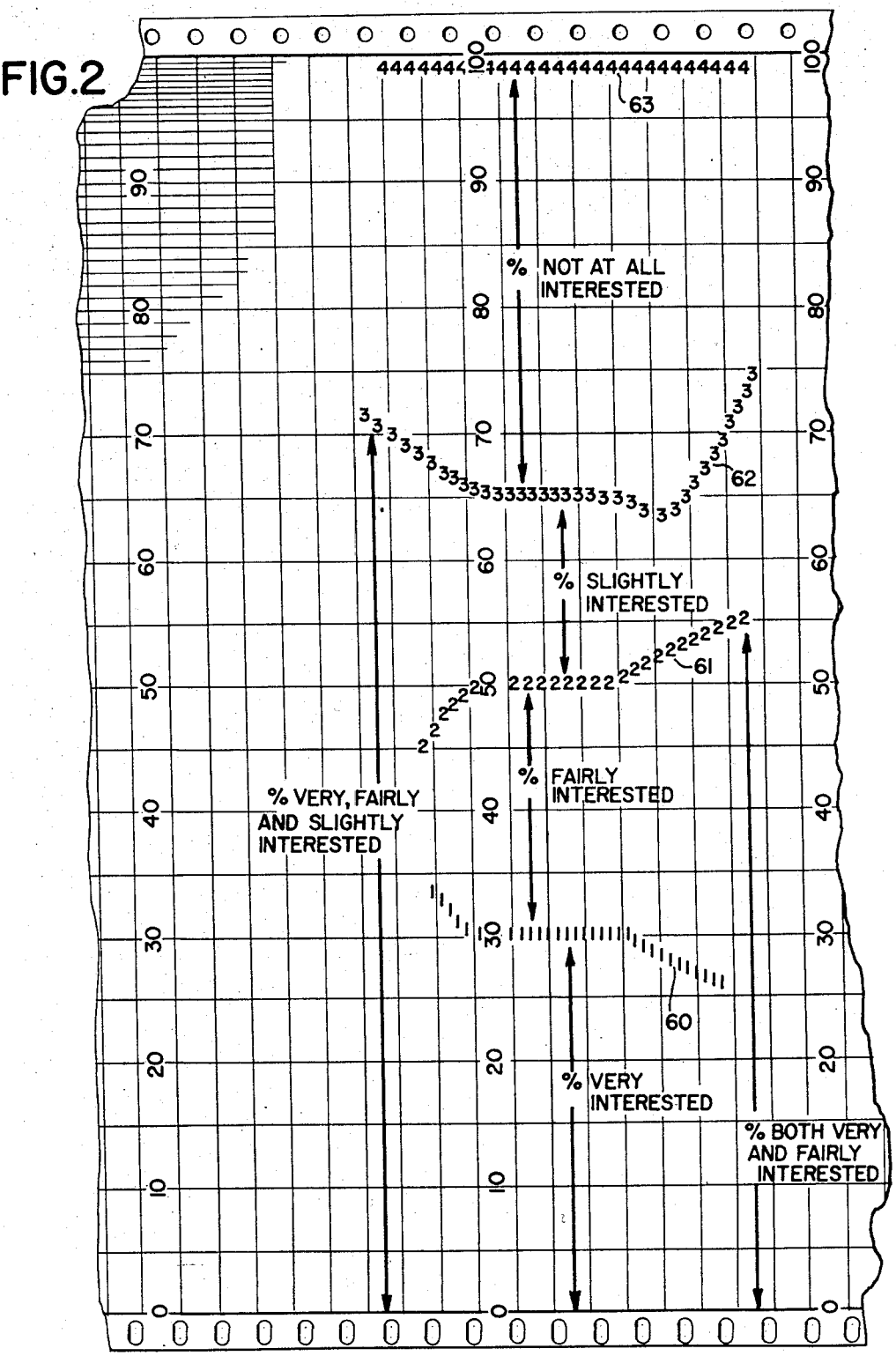

United States Patent Office 2,878,996
Patented Mar. 24, 1959

2,878,996

AUDIENCE REACTION MEASURING SYSTEM

William J. Millard, Jr., Pelham Manor, N.Y.

Application December 30, 1954, Serial No. 478,762

9 Claims. (Cl. 235—52)

This invention relates to a method of and means for evaluating the reactions of an audience to a play or other program as it is being performed. It constitutes an improvement upon the methods and apparatus disclosed in the pending application of Blaustein et al. Serial No. 395,889, filed December 3, 1953, now Patent No. 2,712,-976, granted July 12, 1955.

As in said prior application, the present invention contemplates providing each member of an audience, or each of a suitable number of selected members, with a switch box of appropriate construction which will enable such members to designate their individual reactions to different portions of a show, or the like, as it progresses. Each box carries a plurality of switches each identified with a particular reaction, such as "very interested," "fairly interested," "slightly interested" and "not at all interested." As the show progresses each member designates his reaction to successive incidents by operating the appropriate one of the four switches in the box which he holds in his hands.

In certain of the systems disclosed in said prior application a permanent, printed record is formed in relation to time on a suitable broad record strip passing through a recording apparatus. Each type of reaction reflected by the operation of selected switches in the switch boxes held by the various members of the audience is plotted periodically at suitable short intervals of time. By drawing a graph through the recorded points for each type of reaction an indication is given as to the percentage of the audience which is responding in the several ways mentioned above to the successive portions of the show. An arrangement is also disclosed for plotting a graph which indicates the composite reaction of the switch box holders, in accordance with a selected weighting of the different reactions.

While the system disclosed in said prior application provides an excellent basis for rating audience reaction to different portions of a show as it progresses, it has resulted in a record which cannot be readily appraised at a glance. This is due to the fact that the several graphs plotted to indicate the different reactions of members of the audience frequently cross or overlap as they progress along the record strip.

A primary object of the present invention has been to provide a record or indication of audience reaction which may be more readily evaluated. Toward this end the invention contemplates the recording or indication at periodic intervals of the number or percentage of the switch box holders who are included in each of the following categories:

(1) Those designating that they are "very interested,"

(2) The combined group designating that they are "very interested" or "fairly interested,"

(3) The combined group designating that they are "very interested," "fairly interested" or "slightly interested," and (4) The combined group designating that they are "very interested," "fairly interested," "slightly interested" or "not at all interested."

In recording at periodic intervals dots or special symbols in accordance with the combined reactions of the various groups of switch box holders in the four categories outlined above, it will be appreciated that a line drawn through the dots or symbols identified with one category will not overlap with or cross the corresponding line for any of the other categories. There will normally be a space which may vary from interval to interval along the length of the record sheet or strip between each of the lines. The spaces between the several lines and between the outermost lines and the margins of the record strip will indicate the percentage of the switch box holders designating each of the four types of reaction at each recording interval throughout the performance. Thus the record sheet or strip provides information which may be readily analyzed at a glance.

If desired a record may be provided also of the composite reaction of the switch box holders in the general manner set forth in the prior application mentioned above. This composite reaction preferably takes into account only those switch box holders who designate one of the reactions "very interested," "fairly interested," or "slightly interested" and different weights may be assigned to these reactions in accordance with any weighting system desired.

It is unnecessary in the system contemplated by the present invention to provide any indication as to the number or percentage of switch box holders who are designating some reaction at a particular time through the operation of one or another of the switches of the switch boxes. The reading provided for the fourth category outlined above should normally be at or near the 100% mark. In any event, by appropriate calibration of the system prior to the commencement of a show the location of the 100% activity may be readily noted and the departure from this of the line designating the combined reaction of the entire group of switch box holders who are operating one or another of the switches may be noted and this will indicate how many are failing to designate any reaction.

Other objects, features, and advantages of the invention will appear from the detailed description of an illustrative embodiment of the same which will now be given in conjunction with the accompanying drawings, in which:

Fig. 1 is a circuit diagram illustrating schematically a pair of switch boxes and the electrical connections therefrom to a suitable printing recorder; and Fig. 2 is a plan view of a section of a record strip printed in accordance with the invention.

Referring now to the drawings, it should be understood that the invention contemplates the use of a predetermined number of switch boxes each held by a different member of the audience in a typical test system. Fifty such switch boxes may, for example, be distributed through the audience and connected with a single recorder in the same general manner as is disclosed in said prior application Serial No. 395,889. In Fig. 1 only two switch boxes are shown connected into the system, but it will be understood that the others are connected in parallel with those shown in the manner explained.

Referring now to Fig. 1 two switch boxes 10 and 10a are shown schematically in broken outline. Each of these switch boxes, and the others connected into the system, may suitably be of the character disclosed in said prior application. It embodies four resistors 11, 12, 13, and 14 (or 11a, 12a, 13a, and 14a) of relatively high resistance, for example 10,000 ohms each. Switches 15, 16, 17, and 18 are associated with the respective resistors 11, 12, 13 and 14 and are arranged for manual operation by the switch box holder through the depression of a switch button or the rocking of a lever. In the use of the box only one switch will be operated at a time. Assuming that switch 15 is operated into closed position from its normally open position, it will serve to connect the resistor 11 with a common line 19 interconnecting one end of each of the four resistors. This common line extends to the positive side of a direct current source, such as a two volt battery. The negative side of this battery is connected by a line 21 with a common line 22 which extends to a terminal 22a of the recording unit. Lines 23, 24, 25 and 26 also serve to connect the common line 22 with a respective one of the resistors 11, 12, 13 and 14. Accordingly, upon closing of the switch 15 a circuit will be completed through the resistor 11. Similarly, the closing of any one of the switches 16, 17 and 18 will close a circuit through the related resistor.

In the line 23 there is provided a resistor 27 of relatively low voltage, say between 2 and 6 ohms. The magnitude of this resistance will depend upon the characteristics of the recording unit employed. If desired an adjustable resistor may be substituted for the fixed resistor 27 to permit suitable adjustment of the resistance to meet the requirements of the recorder. Line 24 has, in series, three resistors 28, 29 and 30, which combined should have the same resistance as resistor 27. If the latter is of 4 ohm resistance the resistor 28 may be of 2 ohms, and the resistors 29 and 30 may each be 1 ohm. Similarly line 25 has three resistors 31, 32 and 33 in series and these are preferably of the same character as resistors 28, 29 and 30. Line 26 has four resistors 34, 35, 36 and 37, all of which are of equal resistance and combined in series have the same resistance as resistor 27. If the latter is of 4 ohms resistance, each of the resistors 34–37 inclusive may be of 1 ohm resistance. As in the case of resistor 27, all of the resistors 28–37 inclusive may be of a variable resistance type.

Resistors 38, 39, 40 and 41 of relatively high resistance, for example, 2,000 ohms, are interconnected at one end and connected through a line 42 to terminal 42a of the recording unit. The opposite end of resistor 38 is connected by line 43 with the line 23 at a point intermediate the resistors 11 and 27. Similarly the opposite end of resistor 39 is connected by line 44 with the line 24 intermediate the resistors 12 and 30, the opposite end of resistor 40 is connected by a line 45 with the line 25 intermediate the resistors 13 and 33, and the opposite end of resistor 41 is connected through a line 46 to the line 26 at a point intermediate the resistors 14 and 37. Resistors 47, 48 and 49 having the same resistance as resistors 38–41 have one of their ends interconnected and these ends are connected by a line 50 with a terminal 50a of the recorder unit. The opposite end of resistor 47 is connected by a line 51 with the line 24 between the resistors 29 and 30. Resistor 48 is similarly connected by line 52 with the line 25 at a point intermediate the resistors 32 and 33, while resistor 49 is connected by a line 53 with the line 27 at a point intermediate the resistors 36 and 37.

Two resistors 54 and 55 have one of their ends interconnected and these ends are connected by a line 56 with a terminal 56a of the recorder unit. The opposite end of resistor 54 is connected by a line 57 with the line 25 at a point intermediate the resistors 31 and 32 while the opposite end of resistor 55 is connected by a line 58 with the line 26 at a point intermediate the resistors 35 and 36. Resistors 54 and 55 have the same resistance as resistors 38–41, i.e., preferably 2,000 ohms each. A line 59 connected with the line 26 intermediate the resistors 34 and 35 extends to a terminal 59a of the recorder unit.

As disclosed in said prior application Serial No. 395,889, the specified terminals of the recorder unit are connected, respectively, with different segment bars of a commutator within the unit, the latter being a self-balancing, slide wire potentiometer. The common contact 22a of the unit is connected with a contact bar forming part of the potentiometer system. As a contact arm swings over the commutator segment bars, circuits will be completed within the unit successively to measure the potential drop across different resistors or groups of resistors identified with the circuits completed, and dots or other symbols will be recorded on the record strip or sheet. These dots or symbols will be printed in different positions across the record strip, as it advances at a predetermined rate through the recorder, and will indicate the reaction and combinations of reactions of the audience in the four categories or groups hereinabove specified, at the particular instants at which the dots or symbols are printed. Thus when the segment bar connected with contact 59a is reached it will measure the drop of potential across the resistor 34. That drop of potential will be proportionate to the number of switches 18 that are being operated at the time by the holders of the switch boxes distributed through the audience. It should be understood that all of the switch boxes will have their lines 26 interconnected at a point between the resistors 14 and 37, as shown in relation to the two boxes 10 and 10a, so that the current flowing through all of the resistors 14 in the plurality of switch boxes will pass through the resistor 34 and thus influence the drop of potential across this resistor.

In a similar way, when the contact arm of the recorder unit engages the segment bar connected with terminal 56a the recorder will respond to the drop of potential across the resistors 31, 34 and 35, the resistors 34 and 35 being arranged in parallel with resistor 31. Likewise when the segment bar connected with terminal 50a of the recorder unit is rendered effective the line 50 and resistors 47, 48 and 49 will place in parallel the resistor 28, combined resistors 31 and 32, and combined resistors 34, 35, and 36, so that the drop in potential through these three groups of resistors in parallel will be reflected by the location of the dot or symbol recorded at this particular time. So also, when the segment bar connected with terminal 42a of the recorder unit is rendered effective, it will, through the line 42 and resistors 38–41, inclusive, measure the drop of potential in four parallel circuits, one carrying resistor 27, another resistors 28, 29, and 30, another resistors 31, 32, and 33, and the last resistors 34, 35, 36, and 37. It will be understood, in each instance, that for the plurality of switch boxes the respective lines 23, 24, 25, and 26 will be intereconnected at points between the resistors within the switch boxes and the resistors 27, 30, 33, and 37.

As a result of the foregoing circuit arrangement the printing wheel of the recorder will first be adjusted to the position across the record strip or sheet which is determined by the number of switches 18 in the plurality of switch boxes which have been closed. This will occur as the control arm in the recorder engages the segment bar connected with terminal 59a. When terminal 56a is effective the position of the printing wheel will be determined by the number of switches 17 and 18 that are being operated at that instant in the plurality of switch boxes, while when terminal 50a is active the position of the recording wheel across the record strip will be determined by the number of switches 16, 17, and 18 that are being operated by all of the switch box holders at the particular instant, and when terminal 42a is active the position of the recording wheel will be determined by the number of switches 15, 16, 17 and 18 that are being operated into the closed position by the holders of the switch boxes.

As a result of the foregoing a record of the character disclosed in Fig. 2 will be produced. As the record sheet of the recorder is advanced past the printing point and the several segment bars are successively rendered effective at periodic intervals, the number 1 or other appropriate symbol will be printed each time that the terminal 59a is active. Subsequently a line 60 may be drawn through these symbols to form a graph representative of the percentage of those in the audience who have designated a "very interested" reaction at various intervals during the performance. A line of symbols 61 will similarly be printed as the terminal 56a is repeatedly rendered effective. A line of symbols 62 will likewise be printed as the terminal 50a becomes repeatedly effective and a line of symbols 63 will be printed as the terminal 42a becomes repeatedly effective. The line 61 which may, for example, be composed of a series of numerals 2 will indicate the percentage of switch box holders who have operated the switches identified with the reactions "very interested" and "fairly interested." Line 62 composed, for example, of a series of numerals 3 will indicate the percentage of switch box holders who have operated switches designating the reactions "very interested," "fairly interested" and "slightly interested." Similarly the line 63 composed, for example, of a series of numerals 4 will show the percentage of switch box holders who are operating any one of the four switches in their respective boxes. If each switch box holder is operating one of the switches in his box the line 63 will be a straight line along the 100% margin of the record strip. A departure from such a straight line will show the percentage of switch box holders who have failed to operate any switch.

To assist in distinguishing one line of numerals or symbols from another more readily the recorder may, if desired, be arranged to print in two or more different colors. For example, the lines 60 and 62 may be printed in blue or black and the lines 61 and 63 may be printed in red.

In order that equal weight may be given to the different reactions designated by the switch box holders, it is desirable that the appropriate selection or adjustment be made of the resistances of resistors 27 to 37 inclusive. The arrangement should be such that the potential drop measured by the recorder unit will be across a resistance of the same magnitude regardless of whether the circuit to the recording unit is completed through the terminal 42a, 50a, 56a, or 59a. For this purpose, assuming that the resistor 34 is of 1 ohm resistance the resistor 35 should be of 1 ohm resistance and resistor 31 should be of 2 ohms resistance. Similarly resistors 36, 32 and 29 should be of 1 ohm resistance and resistor 28 should be of 2 ohms resistance. Likewise resistors 30, 33 and 37 should be of 1 ohm resistance and resistor 27 should be of 4 ohms resistance. It will be understood that the precise value of the resistances indicated above may be varied to suit the requirements of the recorder unit, but they should bear the relationship to each other indicated by the foregoing values.

If desired, a further record may be made of the composite reaction of those showing at least some interest in the show or performance and this is preferably in accordance with some weighting given to each of the reactions "very interested," "fairly interested" and "slightly interested." For this purpose a plurality of resistors 64, 65 and 66 may be arranged in parallel with one end thereof connected to a common line 67 which extends to a terminal 67a of the recording unit which is in turn connected with another segment bar of this unit that is rendered effective periodically upon rotation of the contact arm of the unit. The opposite end of resistor 64 is connected by a line 68 with the line 58, while resistor 65 is connected by a line 69 with the line 57, and resistor 66 is connected by a line 70 with the line 24 at a point between resistors 28 and 29. This arrangement is such that the drop of potential of the current flowing in parallel through the groups of resistors 28, 31, and 34 and 35 will be measured each time that the segment bar connected with terminal 67a of the recorder is engaged by the contact arm of the latter. By appropriate selection of the resistances for the resistors 64, 65 and 66 a desired weighting may be given to the different types of reaction and the composite graph produced on the record strip will fall in a desired general region of the strip. It has been found that resistances of 1567 ohms, 2350 ohms and 4700 ohms, respectively, for the resistors 64, 65 and 66 is quite satisfactory.

Many of the features disclosed in the above mentioned prior application may be incorporated in the improved system. Thus each switch box may be provided with a small electric lamp which is illuminated, as a reminder to the holder of the box that he should operate one of the switches, whenever all of the switches 15–18 are left open. A second series of switches, normally closed, may be interconnected with the switches 15–18 to open the light circuit whenever one of the switches 15–18 is closed. Other switches and circuits may be included in the system to facilitate calibration. Also the system may be operated from an available alternating current source through the rectifier system and other connections disclosed in said pending application.

While an illustrative embodiment of the invention has been disclosed in considerable detail and various modifications have been suggested, it will be understood that other changes may be made in the system within the scope of the appended claims.

What is claimed is:

1. An audience reaction system having a plurality of switch boxes each held by a different member of the audience and each having a plurality of resistors of high resistance and a corresponding plurality of switches each identified with a particular type of reaction, a current source, circuits from said current source extending through said switches and adapted to be selectively closed upon operation of selected switches in said switch boxes, said circuits identified with like reaction switches in the plurality of switch boxes having portions thereof extending through said switches and said resistors in parallel and having a common portion in series with said parallel portions, low resistance means in said common portion of the circuits through said corresponding reaction switches of each type, electrical means for measuring the drops of potential across a plurality of different resistances, and connections from said electrical means to said common portions of said circuits for separately measuring the drops of potential through at least a part of said common portion of the circuit through the switches of the plurality of switch boxes identified with a particular reaction and through at least a part of said common portions of the circuits through a progressively greater number of switches in the plurality of switch boxes identified with a progressively greater number of different reactions, whereby a measurement is provided of the percentage of switches in all of the switch boxes identified with said particular reaction and with each of a progressively greater number of different reactions.

2. An audience reaction system of the character set forth in claim 1 in which said connections from said electrical means to said common portions of said circuits comprises a plurality of resistors having a relatively high resistance intermediate that of said resistors in said switch boxes and that of said low resistance means, said resistors of intermediate resistance being arranged in groups of successively greater number and serving to place in parallel a successively greater number of said common portions of said circuits in the connections to said electrical means.

3. An audience reaction system of the character set forth in claim 2 in which said resistors in said switch boxes are all of equal high resistance and said resistors of intermediate resistance are all of equal resistance.

4. An audience reaction system of the character set forth in claim 3 in which the resistance means of low resistance included in the connections to said electrical means and across which the drops of potential are separately measured by said electrical means are all of equal resistance.

5. An audience reaction system of the character set forth in claim 2 in which said low resistance means in said common portions of the several circuits and said resistors of relatively high resistance are so connected into said connections to said electrical means as to cause the latter to record the reactions indicated by the operation of the switches in the plurality of switch boxes along lines which are spaced successively from each other in accordance with the number of switches identified with each type of reaction that are operated.

6. An audience reaction system of the character set forth in claim 5 in which said low resistance means in said common portions of certain of the several circuits are formed by a plurality of resistors in series, and in which said resistors of relatively high resistance are so connected into said low resistance means as to provide equal resistance in those portions of the several circuits across which the potential drop is measured.

7. An audience reaction system of the character set forth in claim 2 in which the resistance of each of the resistors in said switch boxes is of the order of 10,000 ohms, the resistance of said low resistance means for each of said common portions of said circuits is of the order of 1 to 6 ohms, and the resistance of each of said resistors of intermediate resistance is of the order of 2,000 ohms.

8. An audience reaction system of the character set forth in claim 1 in which each of said switch boxes has at least three switches and related resistors and in which said connections to said electrical means are arranged to provide for the separate measurement of the drops of potential through (1) a portion of the resistance means in said common portion of only one of said circuits, (2) portions of said resistance means in said common portions of two of said circuits including said one of said circuits, (3) portions of said resistance means in said common portions of three of said circuits including said two of said circuits, and so progressively measuring the potential drops through portions of said resistance means in successively increasing numbers of said circuits.

9. An audience reaction system of the character set forth in claim 2 in which a further group of resistors of intermediate resistance is provided in the connections to said electrical means, the resistors of said further group being of progressively increasing resistance, one of said resistors of said further group being arranged in series with a portion of said low resistance means across which the drop of potential is measured, and other of said resistors of said further group being separately arranged in series with different groups of said resistors of relatively high resistance having a successively greater number of said resistors of relatively high resistance.

References Cited in the file of this patent

UNITED STATES PATENTS

| | | |
|---|---|---|
| 1,228,392 | Beighlee | June 5, 1917 |
| 2,491,335 | Rich | Dec. 13, 1949 |
| 2,712,976 | Blaustein et al. | July 12, 1955 |